H. C. KING.
TIME AND PAY ROLL BOOK.
APPLICATION FILED NOV. 17, 1915.
1,279,358.
Patented Sept. 17, 1918.
2 SHEETS—SHEET 1.
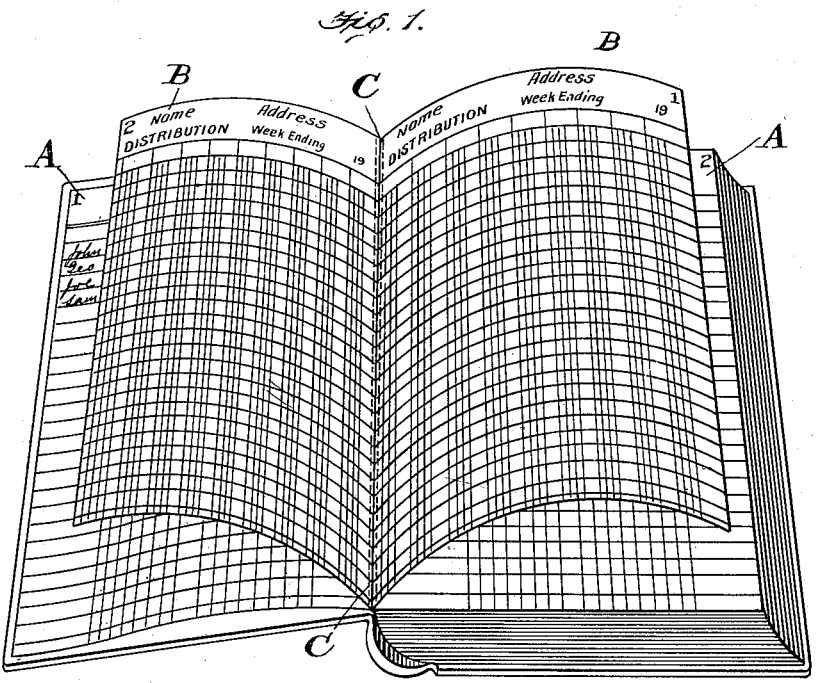

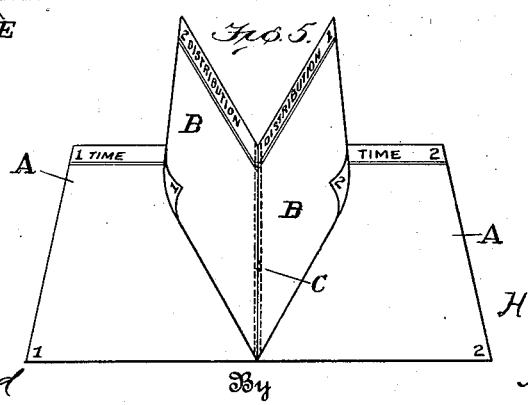

UNITED STATES PATENT OFFICE.

HARRY C. KING, OF BALTIMORE, MARYLAND.

TIME AND PAY ROLL BOOK.

1,279,358.　　　　　　Specification of Letters Patent.　Patented Sept. 17, 1918.

Application filed November 17, 1915. Serial No. 61,886.

*To all whom it may concern:*

Be it known that I, HARRY C. KING, a citizen of the United States, residing at Baltimore, in the State of Maryland, have invented certain new and useful Improvements in Time and Pay Roll Books, of which the following is a specification.

This invention relates to an improved time and pay-roll book, and is particularly designed to make a record of employee's time; the class or character of work performed by each employee: the amount paid for each class of work done by such employee, and the total amounts paid by the employer for the various classes of work his employees performed.

Actuaries of casualty insurance companies, because of the laws relating to workmen's compensation, in case of injury to the workman, have found it necessary to classify and provide a rate of insurance per hundred dollars in wages for each class of occupation, according to the hazard to which each employee is subjected during the time of his occupation. As the premiums to be paid by an employer are based on the amount in wages paid by the employer for each class of work, and the rate per hundred dollars paid in wages for one class of work, is different from the rate per hundred dollars paid in wages for a more hazardous class of work, considerable difficulty is experienced in effecting an audit of an employer's pay rolls and in determining the amount in premiums due the insurance company.

The object therefore, of the present invention is to provide an improved construction and arrangement of time and pay roll book, by means of which the time each day; the rate per day and the total wages paid to employees may be recorded on one page, while on the next confronting or facing page, and on still another page beneath the latter, may be simultaneously recorded, the class of work performed by the employees and the amount paid each employee for one, two or more classes of work each employee performed, so that the classes and the amounts paid for each class of work may be simultaneously recorded on a plurality of pages and one of those plurality of pages retained in the book as an extension record of the time page sheet, while the other or others of the plurality of sheets may be detached by the insurance auditor for the insurance company's record.

For the purpose of more clearly and readily distinguishing between the two kinds of sheets entering into the make-up of the book, I have elected to employ the term "time-sheet" for that sheet on which the names of the employees; the hours employed per day; the rate per day and the total wages,—say per week is recorded, whereas the other sheet containing the classes of work performed by each employee; the amounts paid to each employee in wages for each class, and the total amounts paid for each class of work, I term the "distribution sheet," and in the specification hereinafter, these two terms, "time sheet" and "distribution sheet" will be employed to distinguish one kind of sheets from the other.

The invention is illustrated in the accompanying drawing in which,—

Figure 1, shows a book made up of numerous sheets, with the sheets ruled and bound together in conformity with the invention.

Fig. 2, illustrates one side of a time sheet and one side of a distribution sheet laid out and ruled in accordance with my invention.

Fig. 3, shows the book open at a point where the time sheet is located at the left hand side of the book while the distribution sheets for the same period of time as the time sheet are located at the right hand side of the book.

Fig. 4, illustrates a similar view to that of Fig. 3, in which however, the book is opened at a different place to show that the time sheet at this point is located at the right-hand side of the book while the distribution sheets for the same period of time are located at the left hand side of the book, and Fig. 5, shows four consecutive sheets in the book to illustrate the fact that between the two time sheets there are interposed a plurality (in this instance two) of distribution sheets so that one side of each interposed distribution sheet may serve to record the distribution matter of the time at one side of them, and the other side of each of the same distribution sheets will serve to record the distribution matter of the time sheet at the other side of them.

Referring particularly to Fig. 2, of the drawing, it will be noted that the time sheet A. contains in a vertical row the names of the employees followed by spaces, formed by vertical and horizontal rule lines, in which the hours of time made by each employee in each day of the week is recorded. Other spaces on the same sheet give the rate of pay per day of each employee and still others show the total pay, say for a week. If desired, additional rulings may be provided on the same sheet to show the employee was only partly paid; what the balance of his pay is, and to form a space for the signature of the employees for whatever has been paid him.

It is important to understand that both sides of each time sheet are ruled alike and both are to contain the same character of matter. One side of a time sheet, if it is large enough to contain the names of all the employees of a concern may be utilized as the record for one week or other period of time, while the reverse side of the same ruling, may be utilized as a record for the next week or another period of time. If the one side of a time sheet is not large enough to contain all the names of the employees then the reverse side of the same sheet may be used as a continuation of the list of names for the same period of time.

The point, however, is that both sides of a time sheet are ruled and spaced alike, but the matter on one side is not a copy of the matter on the other side.

The distribution sheets are designated, B, and each is ruled by vertical and horizontal lines so as to form columns,—each column representing a class of work, as for example:—mason, driver, chauffeur, outside carpenter, outside painter, plumber, plasterer, cement walks, and cement forms, etc.

Each of these classes of work may be regarded as differing in hazard, from a casualty insurance standpoint, and each would therefore, bear a different rate of premiums per hundred dollars of payroll, so it is necessary to keep separate the rates and the totals for each class of hazard.

As an example, in Fig. 2, the time sheet record shows that the first name on the list, John Brown, worked forty-four hours, or five days and one-half; that his pay was at the rate of two dollars and fifty cents per day, and that thirteen dollars and seventy-five cents was due him. The distribution sheet B, facing that time sheet, shows that of the thirteen dollars and seventy-five cents paid to John Brown, ten dollars was for work he did on the cement walks, and three dollars and seventy five cents was paid him for work on cement forms.

If the entire pay to a man was for work only one class of work then the entire amount would be placed in the column under the proper heading, and then all the columns will be added to show the totals at the bottom of the distribution sheet B.

Here again, it is important to note, that both sides of each distribution sheet B. are ruled and spaced alike, although the figures placed on the one side are not a copy or duplicate of those on the other side.

Having described the uses and rulings of the time sheet A. and the distribution sheets B. their arrangement and location in the bound book to effect the coaction I desire, will now be explained, reference being made particularly to Fig. 5, of the drawings.

In Fig. 5, it will be noted that two time sheets A—A are shown; that one of these time sheets bears the numeral 1, while the other is numbered 2. Both sides of these time sheets are to be ruled and spaced like the ruling on sheet A. in Figs. 2—3 and 4. Between the two time sheets, A, A, numbered 1, and 2, I interpose, in this instance, two distribution sheets B, B. These two distribution sheets are also to be ruled and spaced like the sheets B. in Figs. 2—3 and 4. The distribution sheet B, facing the time sheet A, numbered 1, has its face that confronts sheets A, also numbered 1, as can be seen by the turned-back lower edge of the sheet in Fig. 5, and the front side of the second distribution sheet B, also has its face numbered 1. It will thus be seen that the time sheet has a face 1, and each forward side of the interposed distribution sheets is numbered 1. This is because the two forward faces 1, of the interposed distribution sheets are to receive the distribution matter that makes up the time and total shown on the time sheet A side 1. Thus the one side of the one time sheet and one side 1, of each of the interposed distribution sheets coacts to form a time and distribution record for the same period of time and may be regarded as a set of sheets made up of one face of one time sheet and one face of each of the two distribution sheets.

By again referring to Fig. 5, it will be noted that the other sides or faces of the same two interposed distribution sheets B, are numbered 2, whereas the time sheet A, at the right hand side has its upper face numbered 2. This numbered arrangement of faces is illustrated in the drawing to make it clear that the distribution record for the record matter on time sheet 2, will be made on the faces 2, of the same two interposed distribution sheets B.

The manner and means for simultaneously recording the distribution record, on the interposed distribution sheets irrespective of how many of these interposed sheets there may be, is illustrated in Figs. 3 and 4 of the drawing.

In Fig. 3, time sheet A, 1 is shown at the left hand side of the book, while the distribution sheets B, 1 for that time sheet are superposed and located at the right hand side of the book,—the lower right hand corner of the uppermost distribution sheet is partly turned back at D. to show, first, that its opposite face is numbered 2, and second that a carbon sheet E, is laid upon the face 1, of the second distribution sheet, with its carboned surface confronting said face 1, of said second distribution sheet while the plain side of the carbon sheet E, confronts the surface number 2, on the under side of the first distribution sheet so that no transfer will be made on the surface 2, when the record is made on the two surfaces numbered 1.

Fig. 4, shows a reversal of the conditions illustrated in Fig. 3, in that the time sheet surface numbered 2, is at the right hand side of the book and the interposed distribution sheets are located at the left hand side of the book with the sheets superposed and with a carbon sheet E. interposed between the superposed sheets with its carbon surface confronting the surface numbered 2, of the second or underneath distribution sheet, so that when the distribution record is made on the surface 2, of the uppermost distribution sheet a duplicate thereof will be made on the upper surface numbered 2, of the second distribution sheet.

It is therefore to be understood that in structure, all time sheets are ruled alike on both sides; all distribution sheets are ruled alike on both of their sides and that a plurality of distribution sheets are interposed between two time sheets.

In operation, it is to be understood that when the book is open flat,—a time sheet will be located at one side of the book (some times at the right and the next time at the left hand side) and the plurality of distribution sheets to receive the distribution record of that time sheet, are superposed and located at the opposite side of the book so that by interposing a carbon sheet between the superposed distribution sheets duplicate copies of the distributions record may be simultaneously made, although there is but one time record.

Of the plural distribution sheets, it is intended that one may remain in the book opposite the time and pay roll record for the same period of time, while the other distribution sheets may be detached from the book,—score or perforated lines C, being preferably provided in the distribution sheets to facilitate the detachment. The detachment of the distribution sheets is always done by a traveling auditor of the insurance company, who before detachment, may readily compare the totals of the time and pay roll sheets with the extensions on the opposite distribution sheet to verify the amounts. The detached distribution sheets are then forwarded to the insurace company and total premiums due the company on each class of hazard determined.

Having described my invention, what I claim is,—

1. A book having two kinds of sheets therein,—one kind of said sheets being termed time sheets which have like rulings and spaces on both sides and each side being designed to show the names of employees, the time of employment of such employees and the wages paid to such employees in a given period of time, and the other kind of sheets in said book being termed distribution sheets which latter have like rulings and spaces on both of their sides and each side being designed to show the character of work performed by each employee and the amount paid to such employee for one or more classes of work that employee performed in a given period of time, said book having a plurality of said distribution sheets for each time sheet in the book whereby one time sheet and a plurality of distribution sheets will form a set and contain a record for the same period of time, so that one of the distribution sheets of each set may be detached from the book leaving a duplicate of that sheet and a time sheet of each set in the book.

2. A book having two kinds or sets of ruled sheets,—one kind or set of sheets being designated time sheets and having like rulings on both sides thereof to show the names of employees, the time of such employees and the total wage paid to such employees, and the other kind or set of sheets being designated distribution sheets and each distribution sheet having like rulings on both sides to show the character of work done by each employee together with amounts paid to each employee for one or more classes of work that employee performed,—said two sets of sheets being normally held in the book with the time sheet at one side of the book and a plurality of distribution sheets to contain the distribution matter for that time sheet at the other side of the book all the distribution sheets for a given time sheet being superposed one on top of another so that the distribution record may be simultaneously made on all of them.

3. A book made up of two kinds of ruled sheets,—one kind of said sheets being termed time sheets which are ruled alike on both sides thereof to show the names of employees, the time made by each of those employees and the wage paid to those employees for the time made, and the other kind of sheets being termed distribution sheets and which are ruled alike on both their sides but of a different ruling from the ruling of the time sheets,—said distribution sheets being designed to show the character of work and the amount paid to each employee for one or more classes of work that employee performed, the sheets being arranged in the book in a set each set comprising two time sheets and a plurality of distribution sheets interposed between the two time sheets of the set,—one side of each distribution sheet being designed to contain the distribution matter for the time sheet at the left hand side of the book and the reverse side of each of said distribution sheets being designed to contain the distribution matter for the time sheet at the right hand side of the book.

In testimony whereof I affix my signature in the presence of two witnesses.

HARRY C. KING.

Witnesses:
 CHAS. B. MANN,
 BERTHA K. WALTER.